United States Patent
Chen et al.

(10) Patent No.: US 9,736,316 B2
(45) Date of Patent: Aug. 15, 2017

(54) NETWORK ADDRESS TRANSLATION TRAVERSAL SYSTEM AND METHOD FOR REAL-TIME COMMUNICATIONS

(71) Applicant: Institute For Information Industry, Taipei (TW)

(72) Inventors: Whai-En Chen, Yilan (TW); Chun-Yen Hsu, Taipei (TW); Bo-En Chen, Zhubei (TW)

(73) Assignee: Institute For Information Industry, Taipei (TW)

( * ) Notice: Subject to any disclaimer, the term of this patent is extended or adjusted under 35 U.S.C. 154(b) by 92 days.

(21) Appl. No.: 14/689,033

(22) Filed: Apr. 16, 2015

(65) Prior Publication Data

US 2015/0304276 A1  Oct. 22, 2015

Related U.S. Application Data

(60) Provisional application No. 61/980,596, filed on Apr. 17, 2014.

(51) Int. Cl.
  *H04L 29/12* (2006.01)
  *H04M 7/00* (2006.01)
  *H04L 29/06* (2006.01)

(52) U.S. Cl.
  CPC ...... *H04M 7/0075* (2013.01); *H04L 61/2517* (2013.01); *H04L 61/2564* (2013.01);
  (Continued)

(58) Field of Classification Search
  None
  See application file for complete search history.

(56) References Cited

U.S. PATENT DOCUMENTS 8,509,148 B2   8/2013  Gleixner et al.
2002/0114333 A1*  8/2002  Xu ............... H04L 29/125
                                       370/392

(Continued)

FOREIGN PATENT DOCUMENTS

CN    1604589 A    4/2005
CN    101141420 B   3/2008

(Continued)

OTHER PUBLICATIONS

Office Action to the corresponding Taiwan Patent Application rendered by the Taiwan Intellectual Property Office (TIPO) on Mar. 17, 2016, 7 pages. (including English translation).

*Primary Examiner* — Charles C Jiang
*Assistant Examiner* — Rose Clark
(74) *Attorney, Agent, or Firm* — Skaar Ulbrich Macari, P.A.

(57) ABSTRACT

A network address translation traversal system and method for real-time communications are provided. The network address translation traversal system includes a user terminal equipment, a network address translation device, a signaling control system and a peer terminal. The user terminal equipment is in a private network, while the signaling control system and the peer terminal are in a public network. The signaling control system is configured to instruct the network address translation device to create a network address translation mapping for a real-time communication connection. The peer terminal is configured to create the real-time communication connection with the user terminal equipment via the network address translation device directly according to the network address translation mapping.

12 Claims, 4 Drawing Sheets

(52) U.S. Cl.
CPC ...... *H04L 61/2582* (2013.01); *H04L 65/1006* (2013.01); *H04L 65/1069* (2013.01); *H04L 61/2514* (2013.01)

(56) References Cited

U.S. PATENT DOCUMENTS

| | | | |
|---|---|---|---|
| 2003/0009561 A1* | 1/2003 | Sollee | H04L 29/06 709/227 |
| 2004/0139230 A1* | 7/2004 | Kim | H04L 29/06027 709/245 |
| 2006/0026288 A1* | 2/2006 | Acharya | G06Q 10/10 709/227 |
| 2006/0272009 A1* | 11/2006 | Stott | H04L 29/06027 726/3 |
| 2008/0126528 A1* | 5/2008 | Takeda | H04L 29/12066 709/223 |
| 2009/0164553 A1 | 6/2009 | Chiu | |
| 2010/0205313 A1* | 8/2010 | Boire-Lavigne | H04L 29/125 709/228 |
| 2011/0055392 A1 | 3/2011 | Shen et al. | |
| 2012/0158862 A1* | 6/2012 | Mosko | H04L 65/1096 709/206 |
| 2012/0317637 A1 | 12/2012 | Huang | |
| 2013/0232217 A1 | 9/2013 | Kristiansson et al. | |
| 2014/0029462 A1* | 1/2014 | Stewart | H04L 43/06 370/252 |

FOREIGN PATENT DOCUMENTS

| | | |
|---|---|---|
| CN | 101552848 B | 10/2009 |
| CN | 102158567 A | 8/2011 |
| CN | 102195933 B | 9/2011 |
| CN | 102209124 B | 10/2011 |
| CN | 102318323 B | 1/2012 |
| EP | 2045990 B1 | 4/2009 |
| TW | 200929971 A | 7/2009 |
| TW | 201110645 A1 | 3/2011 |
| WO | 2005057882 A1 | 6/2005 |

\* cited by examiner

NETWORK ADDRESS TRANSLATION TRAVERSAL SYSTEM AND METHOD FOR REAL-TIME COMMUNICATIONS

PRIORITY

This application claims priority to U.S. Provisional Patent Application No. 61/980,596 filed on Apr. 17, 2014, which is hereby incorporated by reference in its entirety.

FIELD

The present invention relates to a network address translation traversal system and method. More particularly, the present invention relates to a network address translation traversal system and method for real-time communications.

BACKGROUND

With the growing of the Internet devices, solving the IP address shortage problem is more and more important. Network Address Translation (NAT) and Internet Protocol version 6 (IPv6) are two possible solutions. Since IPv6 is not widely deployed yet, NAT is the major solution that shares a public IP address to several devices in the NAT.

In essence, the NAT traversal technology has the network address translation traversal problem, i.e., breaking the peer-to-peer communications and the Internet-oriented requests. To solve the network address translation traversal problem, a lot of technologies have been proposed, e.g., STUN (Session Traversal Utilities for NAT), TURN (Traversal Using Relay NAT), ALG (Application-Layer Gateway) and so on.

For example, the technical specifications of 3GPP (Third Generation Partnership Project) adopts the ALG technology to solve the network address translation traversal problem. In the ALG technology, a user terminal equipment must initiate a communication with a real-time transport protocol (RTP) proxy in order to create an RTP Internet address/port number mapping table. In other words, RTP packets must be transmitted firstly to the RTP proxy before being translated and transmitted to other peer terminals. For the ALG technology, the RTP proxy adds extra delay of the RTP packets and increases the possibility of losing the RTP packets.

Furthermore, real-time communications (e.g., Voice over IP (VoIP)) are extremely sensitive to the packet delay. Hence, for the ALG technology that needs to use the RTP proxy for network address translation and transmission of the RTP packets, the performance of the real-time communications will necessarily be compromised. In addition to the ALG technology, other conventional technologies for solving the network address translation traversal problem all must use an additional server or proxy for network address translation and transmission of the RTP packets. For example, the STUN technology needs to use a STUN server to obtain an IP, and needs to use an ICE (Interactive Connectivity Establishment) server to test availability of the IP; and the TURN technology also needs use of a TURN server.

According to the above descriptions, these conventional technologies for solving the network address translation traversal problem are necessarily confronted with the problems of extra packet delay and packet loss. Accordingly, an urgent need exists in the art to provide a more effective solution to the network address translation traversal problem in real-time communications.

SUMMARY

An objective of the present invention is to provide a more effective solution to the network address translation traversal problem in real-time communications.

Disclosed is a network address translation traversal system for real-time communications. The network address translation traversal system comprises a user terminal equipment, a network address translation device, a signaling control system and a peer terminal. The user terminal equipment is located in a private network, and the signaling control system and the peer terminal are located in a public network. The signaling control system is configured to instruct the network address translation device to create a network address translation mapping for a real-time communication connection. The peer terminal is configured to create the real-time communication connection with the user terminal equipment via the network address translation device directly according to the network address translation mapping.

Also disclosed is a network address translation traversal method for real-time communications. The network address translation traversal method is used in a system. The system comprises a user terminal equipment, a network address translation device, a signaling control system and a peer terminal. The user terminal equipment is located in a private network, and the signaling control system and the peer terminal are located in a public network. The network address translation traversal method in certain embodiments comprises: enabling the signaling control system to instruct the network address translation device to create a network address translation mapping for a real-time communication connection; and enabling the peer terminal to create the real-time communication connection with the user terminal equipment via the network address translation device directly according to the network address translation mapping.

Further disclosed are a network address translation traversal system and method for real-time communications. During the process of signaling exchange in certain embodiments, a signaling control system directly instructs a network address translation device to create a network address translation mapping for a real-time communication connection between a user terminal equipment and a peer terminal. Through this operation, the network address translation device is imparted with an ability to fulfill network address translation and transmission of real-time communication packets (e.g., RTP packets). Therefore, as compared to the conventional mechanisms of solving the network address translation traversal problem, the present invention allows the user terminal equipment and the peer terminal to create the real-time communication connection directly via the network address translation device without the need of a proxy (e.g., the RTP proxy in the ALG technology) or a server (e.g., the STUN server, the ICE server, the TURN server or the like). Besides, because network address translation and transmission of real-time packets transmitted between the user terminal equipment and the peer terminal are accomplished via only the network address translation device (i.e., without the need of an additional proxy or server), the delay of the real-time communication packets and the possibility of losing the real-time packets can be effectively reduced.

With the following descriptions of preferred embodiments accompanying the drawings, persons skilled in the art can further appreciate what problem the present invention solves, what features the present invention includes and what results the present invention reaches.

DETAILED DESCRIPTION

Figure 1:
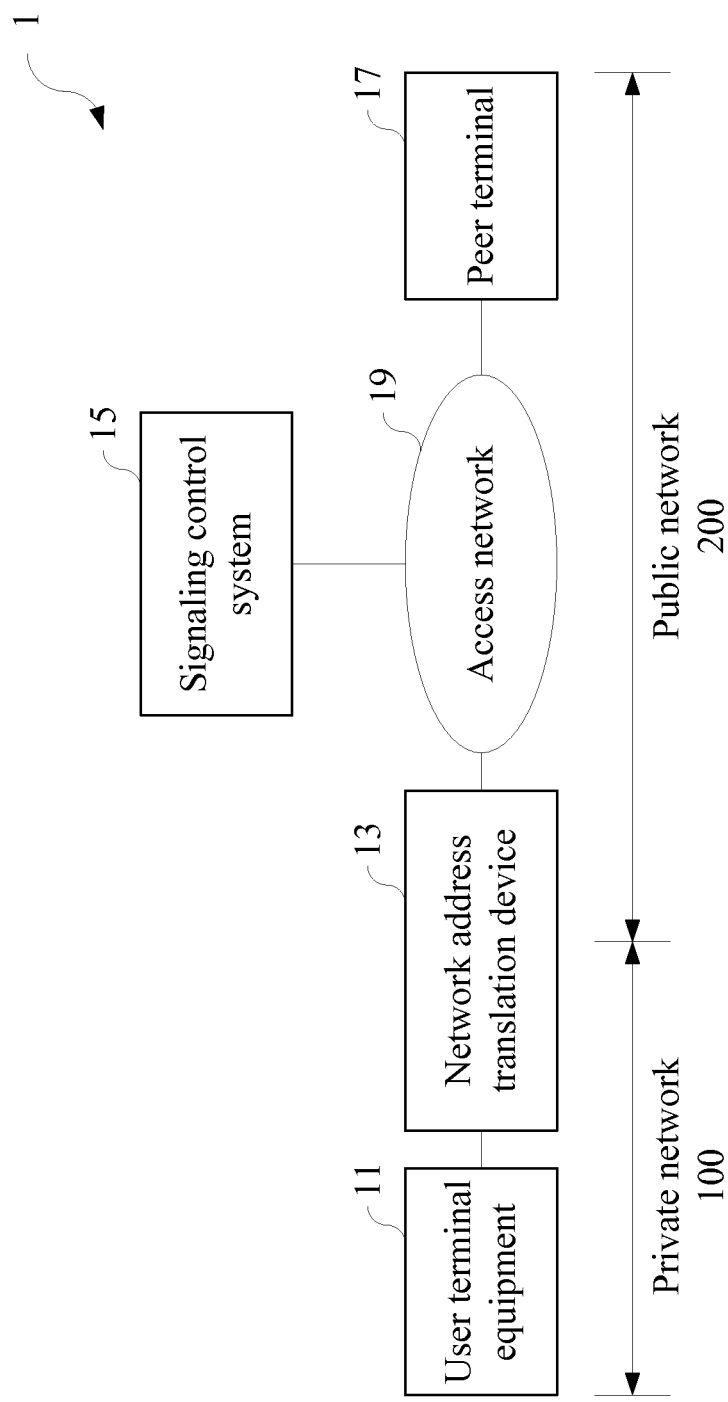
FIG. 1 is a schematic view illustrating a network address translation traversal system according to an embodiment of the present invention.

In the following description, the present invention will be explained with reference to certain example embodiments thereof. However, these example embodiments are not intended to limit the present invention to any specific examples, embodiments, environment, applications or particular implementations described in these example embodiments. Therefore, the description of these example embodiments is only for the purpose of illustration rather than to limit the present invention.

Elements unrelated to the present invention are omitted from the drawings. Dimensional relationships among individual elements in the drawings are illustrated only for ease of understanding, but not to limit the actual scale in implementations of the present invention.

An embodiment ("a first embodiment" hereinafter) of the present invention is a network address translation traversal system for real-time communications. FIG. 1 is a schematic view of the network address translation traversal system. As shown in FIG. 1, the network address translation traversal system 1 comprises a user terminal equipment 11, a network address translation device 13, a signaling control system 15, a peer terminal 17 and an access network 19. The user terminal equipment 11 is located behind the network address translation device 13, that is, the user terminal equipment 11 is located in a private network 100. The signaling control system 15 and the peer terminal 17 are located in front of the network address translation device 13, that is, the signaling control system 15 and the peer terminal 17 are located in a public network 200 (or an operator's network). In other words, the user terminal equipment 11 must perform network address translation via the network address translation device 13 in order to communicate with the signaling control system 15 and the peer terminal 17.

Types of the private network 100 and the public network 200 may vary with different communication network environments. Signal transmissions of the network address translation device 13, the signaling control system 15, and the peer terminal 17 can be accomplished through intermediation of the access network 19. The access network 19 may vary with different communication network environments.

The peer terminal 17 may be another user terminal equipment different from the user terminal equipment 11. The user terminal equipment 11 or the peer terminal 17 may be any of various portable electronic communication devices, e.g., a mobile phone, a digital camera, a notebook computer, a tablet computer or the like. The user terminal equipment 11 or the peer terminal 17 may also be any of various non-portable electronic communication devices, e.g., a desktop computer, a smart household appliance or the like. In some embodiments of the present invention, the peer terminal 17 may also be another signaling control system different from the signaling control system 15.

The network address translation traversal system 1 is suitable for use in various communication network environments. For convenience of description, the communication network environment formulated in the technical specifications of 3GPP will be taken as an example to describe the network address translation traversal system 1, but this is not intended to limit implementations of the network address translation traversal system 1.

Corresponding to the communication network environment formulated in the technical specifications (e.g., TS 23.228 and TS 23.334) of 3GPP, the access network 19 may comprise an IP-connectivity access network (IP-CAN), which is used to provide the IP connectivity necessary for signal transmissions among the network address translation device 13, the signaling control system 15 and the peer terminal 17. Furthermore, the signaling control system 15 may substantially comprise a part or the whole of a core network and/or substantially comprise a part or the whole of an IP multimedia subsystem (IMS). The IMS may comprise a Call Session Control Function (CSCF), an IMS-Application-Layer Gateway (IMS-ALG) and an IMS-Access Gateway (IMS-AGW). The IMS-ALG is used to process session initiation protocol (SIP) traversal, and the IMS-AGW functions as an RTP Proxy to translate RTP packets.

In various communication network environments formulated in the technical specifications of 3GPP, allocations of Internet protocol addresses are all controlled by the core network. Therefore, corresponding to the various communication network environments formulated in the technical specifications of 3GPP, the network address translation device 13 which is configured to allocate the private IP addresses and the public IP addresses to the user terminal equipment 11 may be controlled by the signaling control system 15. In this case, the signaling control system 15 may instruct the network address translation device 13 to create a network address translation mapping for a real-time communication connection, and enable the peer terminal 17 to create the real-time communication connection with the user terminal equipment 11 via the network address translation device 13 directly according to the network address translation mapping without the IMS-AGW (i.e., RTP Proxy).

Figure 2:
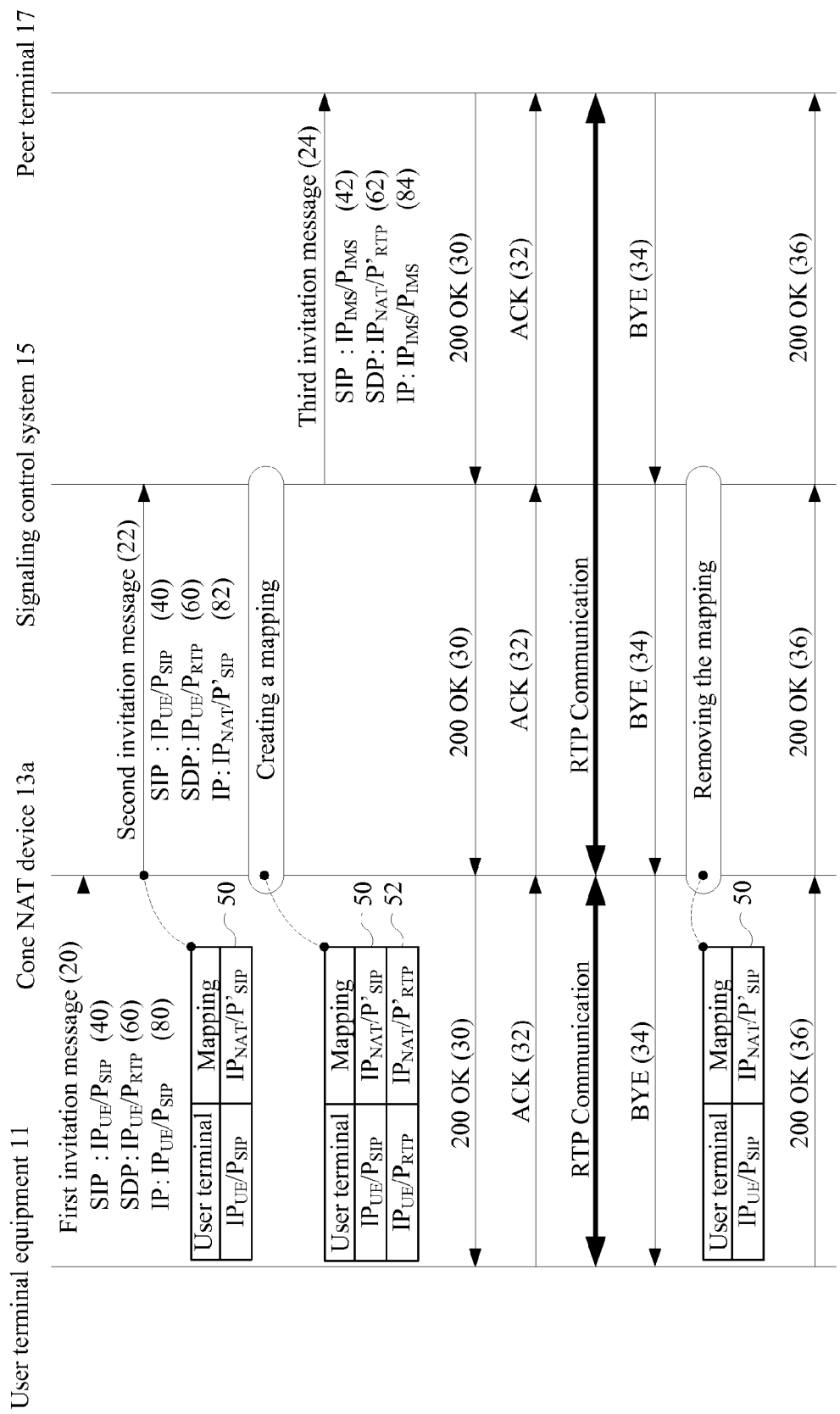
FIG. 2 is a schematic view illustrating that the network address translation traversal system shown in FIG. 1 operates in a communication network environment formulated in the technical specifications of 3GPP.

FIG. 2 is a schematic view illustrating that the network address translation traversal system 1 operates in a communication network environment formulated in the technical specifications of 3GPP, where the network address translation device 13 is a cone network address translation (Cone NAT) device 13a. As shown in FIG. 2, when the user terminal equipment 11 (i.e., the caller) is to create a real-time communication connection (e.g., create a voice session) with the peer terminal 17 (i.e., the callee), the user terminal equipment 11 may transmit a first invitation message 20 to the peer terminal 17. The first invitation message 20 may comprise a first session initiation protocol parameter 40 corresponding to a session initiation protocol, a first session description protocol parameter 60 corresponding to a session description protocol, and a first Internet protocol parameter 80 corresponding to an Internet protocol and a user datagram protocol.

The first session initiation protocol parameter 40, the first session description protocol parameter 60 and the first Internet protocol parameter 80 each comprise an Internet protocol address and a port number. As shown in FIG. 2, the Internet protocol address and the port number comprised in the first session initiation protocol parameter 40 are $IP_{UE}/P_{SIP}$ corresponding to a header of the session initiation protocol; the Internet protocol address and the port number comprised in the first session description protocol parameter 60 are $IP_{UE}/P_{RTP}$ corresponding to a header of the session description protocol; and the Internet protocol address and the port number comprised in the first Internet protocol parameter 80 are $IP_{UE}/P_{SIP}$ corresponding to a header of the Internet protocol and the user datagram protocol.

Furthermore, because the user terminal equipment 11 at the present stage is unaware of the Internet protocol address and the port number of the peer terminal 17, and the user terminal equipment 11 in the private network 100 and the signaling control system 15 in the public network 200 are located in different sub-networks, transmission of the first invitation message 20 from the user terminal equipment 11 to the peer terminal 17 must be accomplished via the Cone NAT device 13a and the signaling control system 15.

After having received the first invitation message 20, the Cone NAT device 13a may translate the first invitation message 20 into a second invitation message 22. In the second invitation message 22, the first Internet protocol parameter 80 has been translated into a second Internet protocol parameter 82. In detail, the Cone NAT device 13a may translate the IP address and the port number $IP_{UE}/P_{SIP}$ comprised in the first Internet protocol parameter 80 into $IP_{NAT}/P'_{SIP}$. That is, the Internet protocol address and the port number comprised in the second Internet protocol parameter 82 are $IP_{NAT}/P'_{SIP}$. Additionally, the Cone NAT device 13a may create and record a network address translation mapping (NAT mapping) 50 between the Internet protocol address and the port number $IP_{UE}/P_{SIP}$, which correspond to the user terminal field, and the Internet protocol address and the port number $IP_{NAT}/P'_{SIP}$, which correspond to the mapping field. The NAT mapping 50 is used to traverse the network address translation necessary for signaling transmissions between the user terminal equipment 11 and the peer terminal 17. After having translated the first invitation message 20 into the second invitation message 22, the Cone NAT device 13a may transmit the second invitation message 22 to the signaling control system 15 (e.g., the CSCF of the IMS) via the access network 19 (e.g., the IP-CAN).

After having received the second invitation message 22, the signaling control system 15 may, according to a comparison between the first session initiation protocol parameter 40 and the second Internet protocol parameter 82, instruct the Cone NAT device 13a to create a network address translation mapping 52 for the first session description protocol parameter 60 and a second session description protocol parameter 62. In detail, the signaling control system 15 may make a comparison between the Internet protocol address and the port number $IP_{UE}/P_{SIP}$ of the first session initiation protocol parameter 40 and the Internet protocol address and the port number $IP_{NAT}/P'_{SIP}$ comprised in the second Internet protocol parameter 82. Because the Internet protocol addresses and the port numbers of the first session initiation protocol parameter 40 and the second Internet protocol parameter 82 are different from each other, the signaling control system 15 can deduce that the second Internet protocol parameter 82 is a parameter that has been translated by the Cone NAT device 13a.

After having determined that the second Internet protocol parameter 82 is a parameter that has been translated by the Cone NAT device 13a, the signaling control system 15 may instruct the Cone NAT device 13a to create a network address translation mapping 52 for the Internet protocol address and the port number $IP_{UE}/P_{RTP}$ comprised in the first session description protocol parameter 60 and the Internet protocol address and the port number $IP_{NAT}/P'_{RTP}$ comprised in a second session description protocol parameter 62. In the network address translation mapping 52, the Internet protocol address and the port number $IP_{UE}/P_{RTP}$ correspond to the user terminal field, and the Internet protocol address and the port number $IP_{NAT}/P'_{RTP}$ correspond to the mapping field. The network address translation mapping 52 is used to traverse the network address translation necessary for creating the real-time communication connection (e.g., the RTP communication) between the user terminal equipment 11 and the peer terminal 17.

The signaling control system 15 may instruct the Cone NAT device 13a to directly create the network address translation mapping 52 between the first session description protocol parameter 60 and the second session description protocol parameter 62. Alternatively, the signaling control system 15 may instruct the Cone NAT device 13a to firstly determine by itself the second session description protocol parameter 62 corresponding to the first session description protocol parameter 60, and then to create the network address translation mapping 52 between the first session description protocol parameter 60 and the second session description protocol parameter 62.

The signaling control system 15 may communicate with the Cone NAT device 13a via various interfaces, for example but not limited to: the HyperText Transfer Protocol (HTTP), the Simple Network Management Protocol (SNMP), and the Secure Shell Protocol (SSH Protocol) or the like.

After having determined that the second Internet protocol parameter 82 is a parameter that has been translated by the Cone NAT device 13a, the signaling control system 15 also may translate the second invitation message 22 into a third invitation message 24. In the third invitation message 24, the first session initiation protocol parameter 40, the first session description protocol parameter 60, and the second Internet protocol parameter 82 have been translated into a second session initiation protocol parameter 42, a second session description protocol parameter 62 and a third Internet protocol parameter 84 respectively. In detail, the signaling control system 15 may translate the Internet protocol address and the port number $IP_{UE}/P_{SIP}$ comprised in the first session initiation protocol parameter 40 into $IP_{IMS}/P_{IMS}$, translate the Internet protocol address and the port number $IP_{UE}/P_{RTP}$ comprised in the first session description protocol parameter 60 into $IP_{NAT}/P'_{RTP}$, and translate the Internet protocol address and the port number $IP_{NAT}/P'_{SIP}$ comprised in the second Internet protocol parameter 82 into $IP_{IMS}/P_{IMS}$. That is, the Internet protocol addresses and the port numbers comprised in the second session initiation protocol parameter 42, the second session description protocol parameter 62 and the third Internet protocol parameter 84 are $IP_{IMS}/P_{IMS}$, $IP_{NAT}/P'_{RTP}$ and $IP_{IMS}/P_{IMS}$ respectively. After having translated the second invitation message 22 into the third invitation message 24, the signaling control system 15 may transmit the third invitation message 24 to the peer terminal 17 via the access network 19 (e.g., the IP-CAN).

After having received the third invitation message 24, the peer terminal 17 may create the real-time communication connection with the user terminal equipment 11 via the Cone NAT device 13a directly according to the third invitation message 24. As shown in FIG. 2, according to the technical specifications of 3GPP, if the peer terminal 17 agrees to perform the real-time communication after having received the third invitation message 24, the peer terminal 17 may transmit a response message 30 (e.g., a 200 OK message) to the user terminal equipment 11 via the signaling control system 15 and the Cone NAT device 13*a*. Then, the user terminal equipment 11 may transmit a final confirmation message 32 (e.g., an ACK message) to the peer terminal 17 via the Cone NAT device 13*a* and the signaling control system 15. After the peer terminal 17 has received the final confirmation message 32, the user terminal equipment 11 and the peer terminal 17 may create the real-time communication connection directly via the Cone NAT device 13*a* and perform the real-time communication (e.g., RTP communication).

In the process where the user terminal equipment 11 and the peer terminal 17 perform the real-time communication directly via the Cone NAT device 13*a*, either of the user terminal equipment 11 and the peer terminal 17 can initiate to end the communication. For example, the peer terminal 17 may transmit an end message 34 (e.g., a BYE message) to the user terminal equipment 11 via the signaling control system 15 and the Cone NAT device 13*a*, and vice verse. Then in response to the end message 34, the user terminal equipment 11 may transmit a response message 36 (e.g., a 200 OK message) to the peer terminal 17 via the Cone NAT device 13*a* and the signaling control system 15, and vice verse.

After having received the end message 34, the signaling control system 15 may, according to the end message 34, instruct the Cone NAT device 13*a* to remove the network address translation mapping 52. In conventional network address translation devices, the network address translation mapping is stored automatically, so the stored network address translation mapping will be removed automatically after a preset time. As compared to the conventional network address translation devices, the Cone NAT device 13*a* of this embodiment stores and removes the network address translation mapping 52 according to the instructions of the signaling control system 15, so the problem with the conventional network address translation devices that the network address translation mapping might be falsely deleted due to the preset removal time can be avoided.

Hereinafter, the method in which the signaling control system 15 instructs the Cone NAT device 13*a* to remove the network address translation mapping 52 according to the end message 34 will be described with reference to an example, but this example is not intended to limit the implementations of the present invention. For example, after having made a comparison between the first session initiation protocol parameter 40 and the second Internet protocol parameter 82, the signaling control system 15 may also create and store a parameter mapping between a header record corresponding to the session description protocol and the port number $P'_{RTP}$ of the second session description protocol parameter 62 according to the comparison result. Based on the technical specifications of 3GPP, the header record of the session description protocol may comprise various predetermined items, e.g., the caller/the callee/the call-identification (From/To/Call-ID). Therefore, after having received the end message 34, the signaling control system 15 may learn from the port number $P'_{RTP}$ of the second session description protocol parameter 62 carried in the end message 34 and the parameter mapping the network address translation mapping 52 that needs to be removed, and then instruct the Cone NAT device 13*a* to remove the network address translation mapping 52.

Figure 3:
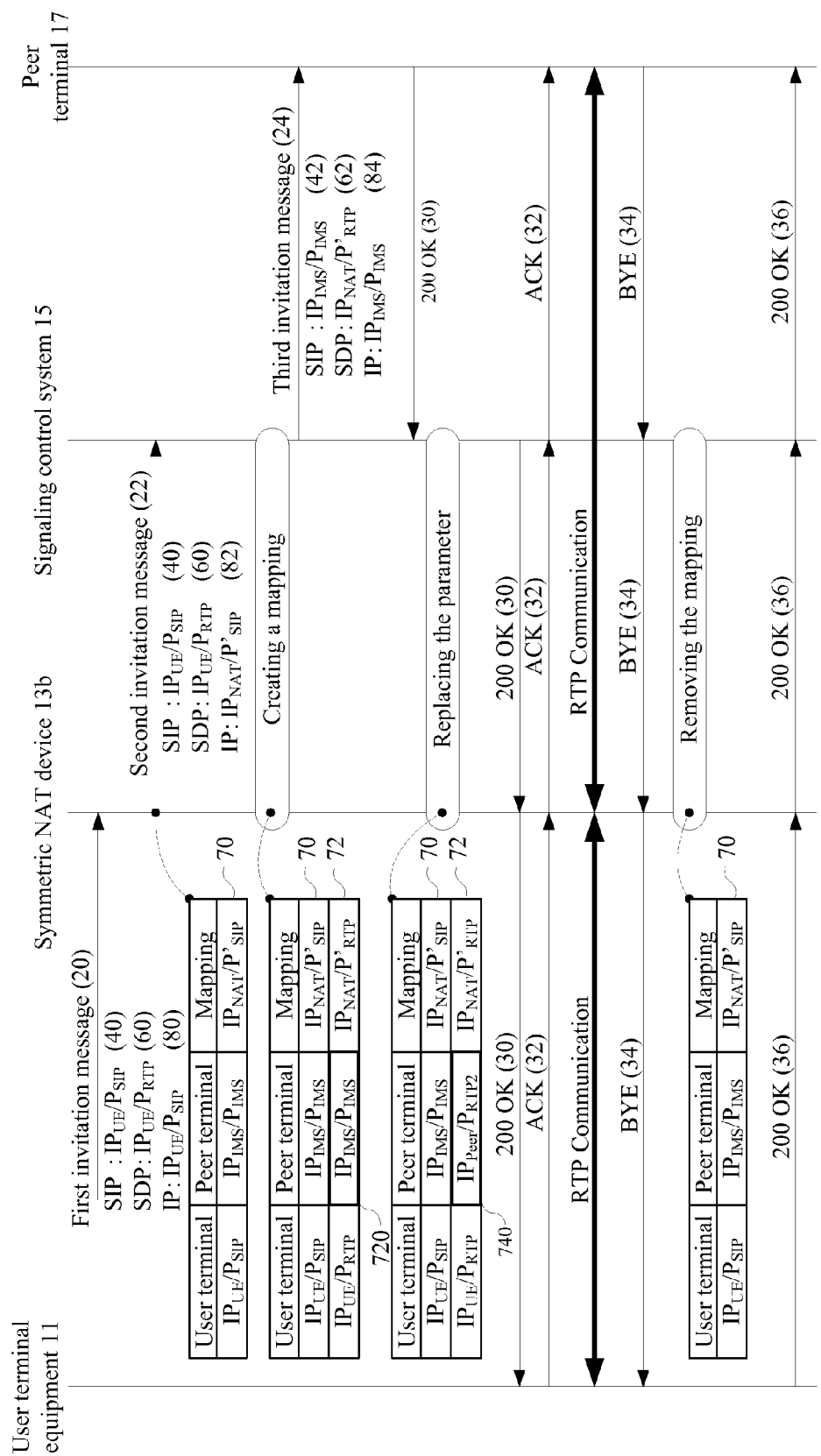
FIG. 3 is another schematic view illustrating that the network address translation traversal system shown in FIG. 1 operates in a communication network environment formulated in the technical specifications of 3GPP.

FIG. 3 is a schematic view illustrating that the network address translation traversal system 1 operates in a communication network environment formulated in the technical specifications of 3GPP. The network address translation device 13 is a symmetric network address translation (Symmetric NAT) device 13*b*. As compared to the Cone NAT device 13*a* shown in FIG. 2, the symmetric NAT device 13*b* shown in FIG. 3 must further comprise the Internet protocol address and the port number of the peer terminal 17 when creating a network address translation mapping. Furthermore, operations of the network address translation traversal system 1 in FIG. 3 are substantially identical to those in FIG. 2. Portions of FIG. 3 that are identical to FIG. 2 can be known from FIG. 2 and related descriptions thereof, so the following description focuses only on portions of FIG. 3 that are different from FIG. 2.

As shown in FIG. 3, differing from the Cone NAT device 13*a*, the symmetric network address translation device 13*b* may create and record a network address translation mapping 70 among the Internet protocol address and the port number $IP_{UE}/P_{SIP}$ corresponding to the user terminal field, the Internet protocol address and the port number $IP_{IMS}/P_{IMS}$ corresponding to the peer terminal field, and the Internet protocol address and the port number $IP_{NAT}/P'_{SIP}$ corresponding to the mapping field after having received the first invitation message 20. For the symmetric NAT device 13*b*, the signaling control system 15 is just a peer callee, so the symmetric NAT device 13*b* may record the Internet protocol address and the port number $IP_{IMS}/P_{IMS}$ of the signaling control system 15 in the peer terminal field. The network address translation mapping 70 is used to traverse the network address translation necessary for the signaling transmissions between the user terminal equipment 11 and the peer terminal 17.

As shown in FIG. 3, different from the Cone NAT device 13*a*, the signaling control system 15 may instruct the symmetric network address translation device 13*b* to create a network address translation mapping 72 for the first session description protocol parameter 60, a temporary session description protocol parameter 720 and a second session description protocol parameter 62 according to a comparison between the first session initiation protocol parameter 40 and the second Internet protocol parameter 82 after having received the second invitation message 22. The temporary session description protocol parameter 720 comprises an Internet protocol address and a port number. In detail, the signaling control system 15 may make a comparison between the Internet protocol address and the port number $IP_{UE}/P_{SIP}$ of the first session initiation protocol parameter 40 and the Internet protocol address and the port number $IP_{NAT}/P'_{SIP}$ comprised in the second Internet protocol parameter 82. Because the Internet protocol addresses and the port numbers of the first session initiation protocol parameter 40 and the second Internet protocol parameter 82 are different from each other, the signaling control system 15 can deduce that the second Internet protocol parameter 82 is a parameter that has been translated by the symmetric NAT device 13*b*.

After having determined that the second Internet protocol parameter 82 is a parameter that has been translated by the symmetric NAT device 13*b*, the signaling control system 15 may instruct the symmetric NAT device 13*b* to create a network address translation mapping 72 for the Internet protocol address and the port number $IP_{UE}/P_{RTP}$ comprised in the first session description protocol parameter 60, the Internet protocol address and the port number comprised in the temporary session description protocol parameter 720 and the Internet protocol address and the port number $IP_{NAT}/P'_{RTP}$ comprised in the second session description protocol parameter 62. In the network address translation mapping 72, the Internet protocol address and the port number $IP_{UE}/P_{RTP}$ correspond to the user terminal field, the Internet protocol address and the port number comprised in the temporary session description protocol parameter 720 correspond to the peer terminal field, and the Internet protocol address and the port number $IP_{NAT}/P'_{RTP}$ correspond to the mapping field. The network address translation mapping 72 is used to traverse the network address translation necessary for creating the real-time communication connection (e.g., the RTP communication) between the user terminal equipment 11 and the peer terminal 17.

Because the signaling control system 15 at the present stage is unaware of the Internet protocol address and the port number of the peer terminal 17, the signaling control system 15 may instruct the symmetric network address translation device 13b to firstly register the Internet protocol address and the port number comprised in the temporary session description protocol parameter 720 into the peer terminal field in the network address translation mapping 72. It should be appreciated that the Internet protocol address and the port number comprised in the temporary session description protocol parameter 720 may be any values conforming to regulations on the Internet protocol address and the port number. Taking the content shown in FIG. 3 as an example, the Internet protocol address and the port number comprised in the temporary session description protocol parameter 720 are respectively the Internet protocol address and the port number $IP_{IMS}/P_{IMS}$ of the signaling control system 15 itself. In some embodiments of the present invention, if the signaling control system 15 at the present stage has been aware of the Internet protocol address and the port number of the peer terminal 17, the signaling control system 15 may also directly instruct the symmetric network address translation device 13b to register the Internet protocol address of the peer terminal 17 itself into the peer terminal field in the network address translation mapping 72.

As shown in FIG. 3, if the peer terminal 17 agrees to perform the real-time communication after having received the third invitation message 24, the peer terminal 17 may transmit a response message 30 (e.g., a 200 OK message) to the user terminal equipment 11 via the signaling control system 15 and the symmetric NAT device 13b. Based on the technical specifications of 3GPP, the response message 30 transmitted by the peer terminal 17 may comprise a session description protocol parameter 740 corresponding to the peer terminal 17. The session description protocol parameter 740 comprises an Internet protocol address and a port number $IP_{Peer}/P_{RTP2}$. Different from the Cone NAT device 13a, the signaling control system 15 can obtain the Internet protocol address and the port number $IP_{Peer}/P_{RTP2}$ corresponding to the peer terminal 17 according to the session description protocol parameter 740 after having received the response message 30. In some embodiments of the present invention, the peer terminal 17 may also transmit other messages (not limited to the response message 30) comprising the session description protocol parameter 740 to the signaling control system 15.

According to the response message 30 or other messages comprising the session description protocol parameter 740 from the peer terminal 17, the signaling control system 15 may instruct the symmetric network address translation device 13b to replace the temporary session description protocol parameter 720 with the session description protocol parameter 740. That is, in the peer terminal field of the network address translation mapping 72, the Internet protocol address and the port number (e.g., the Internet protocol address and the port number $IP_{IMS}/P_{IMS}$ corresponding to the signaling control system 15 itself as shown in FIG. 3) comprised in the temporary session description protocol parameter 720 are replaced with the Internet protocol address and the port number $IP_{Peer}/P_{RTP2}$.

After having received the response message 30, the user terminal equipment 11 may transmit the final confirmation message 32 (e.g., an ACK message) to the peer terminal 17 via the symmetric NAT device 13b and the signaling control system 15. After the final confirmation message 32 is received by the peer terminal 17, the user terminal equipment 11 and the peer terminal 17 may create the real-time communication connection directly via the symmetric NAT device 13b and perform the real-time communication (e.g., RTP communication).

In the process where the user terminal equipment 11 and the peer terminal 17 perform the real-time communication directly via the symmetric NAT device 13b, either of the user terminal equipment 11 and the peer terminal 17 can initiate to end the communication. Because the process related to ending the communication shown in FIG. 3 is substantially identical to that shown in FIG. 2 and can be known from the above descriptions made with reference to FIG. 2, it will not be further described herein.

Another embodiment of the present invention ("a second embodiment" hereinafter) is a network address translation traversal method for real-time communications. The network address translation traversal method may be used in a system. The system may comprise a user terminal equipment, a network address translation device, a signaling control system and a peer terminal. The user terminal equipment is located in a private network, and the signaling control system and the peer terminal are located in a public network. Substantially, the system may correspond to the network address translation traversal system 1 of the first embodiment.

Figure 4:
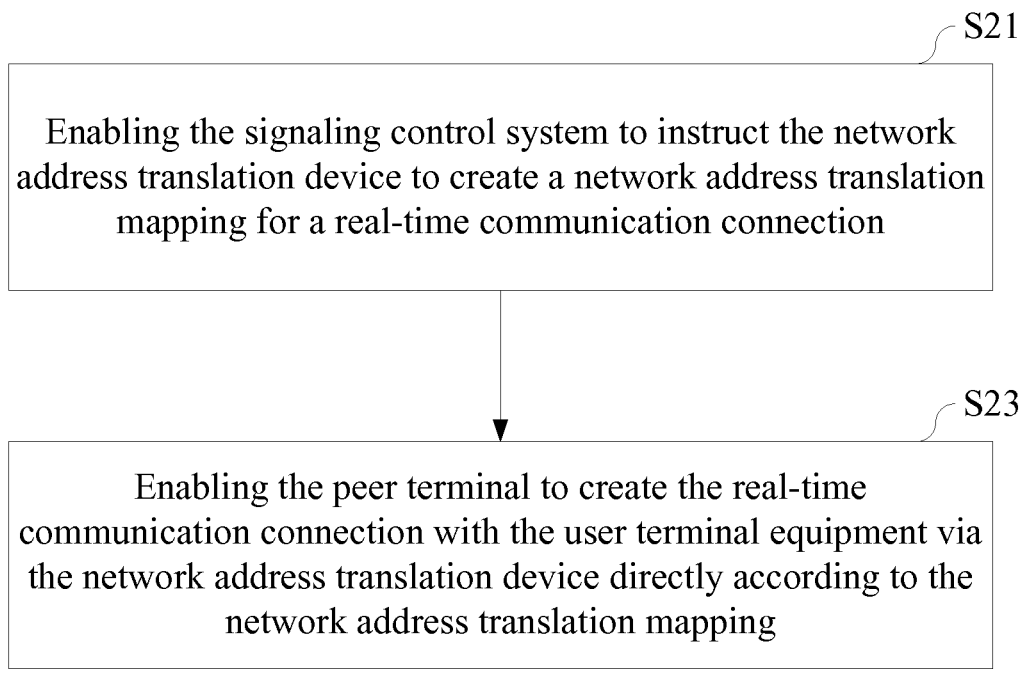
FIG. 4 is a schematic view illustrating a network address translation traversal method for real-time communications according to an embodiment of the present invention.

FIG. 4 is a schematic view of the network address translation traversal method. As shown in FIG. 4, the network address translation traversal method may comprise: enabling the signaling control system to instruct the network address translation device to create a network address translation mapping for a real-time communication connection (step S21); and enabling the peer terminal to create the real-time communication connection with the user terminal equipment via the network address translation device directly according to the network address translation mapping (step S23).

As a first example of this embodiment, the network address translation traversal method may further comprises:

enabling the user terminal equipment to transmit a first invitation message, wherein the first invitation message comprises a first session initiation protocol parameter corresponding to a session initiation protocol, a first session description protocol parameter corresponding to a session description protocol, and a first Internet protocol parameter corresponding to an Internet protocol and a user datagram protocol, and the first session initiation protocol parameter, the first session description protocol parameter and the first Internet protocol parameter each comprise an Internet protocol address and a port number;

enabling the network address translation device to receive the first invitation message and translate the first invitation message into a second invitation message, wherein the first Internet protocol parameter is translated into a second Internet protocol parameter in the second invitation message;

enabling the signaling control system to receive the second invitation message and, according to a comparison between the first session initiation protocol parameter and the second Internet protocol parameter, instruct the network address translation device to create the network address translation mapping for the first session description protocol parameter and a second session description protocol parameter and translate the second invitation message into a third invitation message, wherein the first session description protocol parameter is translated into the second session description protocol parameter in the third invitation message; and enabling the peer terminal to receive the third invitation message, and create the real-time communication connection with the user terminal equipment via the network address translation device directly according to the third invitation message.

In the first example, the network address translation traversal method further comprises:

enabling the user terminal equipment or the peer terminal to transmit an end message to the signaling control system; and enabling the signaling control system to, according to the end message, instruct the network address translation device to remove the network address translation mapping.

In the first example, the network address translation traversal method may further comprises:

enabling the signaling control system to create a parameter mapping between a header record corresponding to the session description protocol and the port number of the second session description protocol parameter according to the comparison between the first session initiation protocol parameter and the second Internet protocol parameter;

enabling the user terminal equipment or the peer terminal to transmit an end message to the signaling control system; and enabling the signaling control system to, according to the end message and the parameter mapping, instruct the network address translation device to remove the network address translation mapping.

As a second example of this embodiment, the network address translation traversal method may further comprises the following steps in addition to all the steps of the first example:

enabling the signaling control system to, according to the comparison between the first session initiation protocol parameter and the second Internet protocol parameter, instruct the network address translation device to add a temporary session description protocol parameter in the network address translation mapping;

enabling the peer terminal to transmit a message to the signaling control system after receiving the third invitation message, wherein the message comprises a session description protocol parameter corresponding to the peer terminal; and enabling the signaling control system to, according to the message from the peer terminal, instruct the network address translation device to replace the temporary session description protocol parameter with the session description protocol parameter corresponding to the peer terminal, wherein the temporary session description protocol parameter and the session description protocol parameter corresponding to the peer terminal each comprise an Internet protocol address and a port number.

In the second example, the network address translation traversal method may further comprises:

enabling the user terminal equipment or the peer terminal to transmit an end message to the signaling control system; and enabling the signaling control system to, according to the end message, instruct the network address translation device to remove the network address translation mapping.

In the second example, the network address translation traversal method further comprises:

enabling the signaling control system to create a parameter mapping between a header record corresponding to the session description protocol and the port number of the second session description protocol parameter according to the comparison between the first session initiation protocol parameter and the second Internet protocol parameter;

enabling the user terminal equipment or the peer terminal to transmit an end message to the signaling control system; and enabling the signaling control system to, according to the end message and the parameter mapping, instruct the network address translation device to remove the network address translation mapping.

The network address translation traversal method substantially comprises the steps corresponding to all the operations of the network address translation traversal system 1 of the first embodiment. The corresponding steps not recorded in the second embodiment can be directly known by people of ordinary skill in the art according to the related descriptions of the network address translation traversal system 1 of the first embodiment, so they will not be further described herein.

The present invention provides a network address translation traversal system and method for real-time communications. More particularly, during the process of signaling exchange in the present invention, a signaling control system directly instructs a network address translation device to create a network address translation mapping for a real-time communication connection between a user terminal equipment and a peer terminal. Through this operation, the network address translation device is imparted with an ability to fulfill network address translation and transmission of real-time communication packets (e.g., RTP packets). Therefore, as compared to the conventional mechanisms of solving the network address translation traversal problem, the present invention allows the user terminal equipment and the peer terminal to create the real-time communication connection directly via the network address translation device without the need of a proxy (e.g., the RTP proxy in the ALG technology) or a server (e.g., the STUN server, the ICE server, the TURN server or the like). Besides, because network address translation and transmission of real-time packets transmitted between the user terminal equipment and the peer terminal are accomplished via only the network address translation device (i.e., without the need of an additional proxy or server), the delay of the real-time communication packets and the possibility of losing the real-time packets can be effectively reduced.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A network address translation traversal system for real-time communications, comprising:
   a user terminal equipment located in a private network;
   a network address translation device;
   an IMS located in a public network, being configured to instruct the network address translation device to create a network address translation mapping for a real-time communication connection; and
   a peer terminal located in the public network, being configured to create the real-time communication connection with the user terminal equipment via the network address translation device directly according to the network address translation mapping;
   wherein:
   the user terminal equipment is configured to transmit a first invitation message, the first invitation message comprises a first session initiation protocol parameter corresponding to a session initiation protocol, a first session description protocol parameter corresponding to a session description protocol, and a first Internet protocol parameter corresponding to an Internet protocol and a user datagram protocol, and the first session initiation protocol parameter, the first session description protocol parameter and the first Internet protocol parameter each comprise an Internet protocol address and a port number;
   the network address translation device is configured to receive the first invitation message and translate the first invitation message into a second invitation message, and in the second invitation message, the first Internet protocol parameter is translated into a second Internet protocol parameter;
   the IMS is configured to receive the second invitation message, and according to a comparison between the first session initiation protocol parameter and the second Internet protocol parameter, instruct the network address translation device to create the network address translation mapping for the first session description protocol parameter and a second session description protocol parameter and translate the second invitation message into a third invitation message, and in the third invitation message, the first session description protocol parameter is translated into the second session description protocol parameter; and
   the peer terminal is configured to receive the third invitation message, and create the real-time communication connection with the user terminal equipment via the network address translation device directly according to the third invitation message.

2. The network address translation traversal system of claim 1, wherein the user terminal equipment or the peer terminal further transmits an end message to the IMS, and according to the end message, the IMS instructs the network address translation device to remove the network address translation mapping.

3. The network address translation traversal system of claim 2, wherein the IMS further creates a parameter mapping between a header record corresponding to the session description protocol and the port number of the second session description protocol parameter according to the comparison between the first session initiation protocol parameter and the second Internet protocol parameter, and according to the end message and the parameter mapping, instructs the network address translation device to remove the network address translation mapping.

4. The network address translation traversal system of claim 1, wherein:
   the IMS further instructs the network address translation device to add a temporary session description protocol parameter in the network address translation mapping according to the comparison between the first session initiation protocol parameter and the second Internet protocol parameter;
   the peer terminal further transmits a message to the IMS after receiving the third invitation message, wherein the message comprises a session description protocol parameter corresponding to the peer terminal; and
   the IMS further instructs the network address translation device to replace the temporary session description protocol parameter with the session description protocol parameter corresponding to the peer terminal according to the message from the peer terminal, wherein the temporary session description protocol parameter and the session description protocol parameter corresponding to the peer terminal each comprise an Internet protocol address and a port number.

5. The network address translation traversal system of claim 4, wherein the user terminal equipment or the peer terminal further transmits an end message to the IMS, and according to the end message, the IMS instructs the network address translation device to remove the network address translation mapping.

6. The network address translation traversal system of claim 5, wherein the IMS further creates a parameter mapping between a header record corresponding to the session description protocol and the port number of the second session description protocol parameter according to the comparison between the first session initiation protocol parameter and the second Internet protocol parameter, and according to the end message and the parameter mapping, instructs the network address translation device to remove the network address translation mapping.

7. A network address translation traversal method for real-time communications, the network address translation traversal method being used in a system that comprises a user terminal equipment, a network address translation device, an IMS and a peer terminal, the user terminal equipment being located in a private network, and the IMS and the peer terminal being located in a public network, the network address translation traversal method comprising:
   the IMS instructing the network address translation device to create a network address translation mapping for a real-time communication connection; and
   the peer terminal creating the real-time communication connection with the user terminal equipment via the network address translation device directly according to the network address translation mapping;
   the user terminal equipment transmitting a first invitation message, wherein the first invitation message comprises a first session initiation protocol parameter corresponding to a session initiation protocol, a first session description protocol parameter corresponding to a session description protocol, and a first Internet protocol parameter corresponding to an Internet protocol and a user datagram protocol, and the first session initiation protocol parameter, the first session description protocol parameter and the first Internet protocol parameter each comprise an Internet protocol address and a port number;
   the network address translation device receiving the first invitation message and translate the first invitation message into a second invitation message, wherein the first Internet protocol parameter is translated into a second Internet protocol parameter in the second invitation message;

the IMS receiving the second invitation message and, according to a comparison between the first session initiation protocol parameter and the second Internet protocol parameter, instruct the network address translation device to create the network address translation mapping for the first session description protocol parameter and a second session description protocol parameter and translate the second invitation message into a third invitation message, wherein the first session description protocol parameter is translated into the second session description protocol parameter in the third invitation message; and the peer terminal receiving the third invitation message, and create the real-time communication connection with the user terminal equipment via the network address translation device directly according to the third invitation message.

8. The network address translation traversal method of claim 7, further comprising:

the user terminal equipment or the peer terminal transmitting an end message to the IMS; and the IMS instructing, according to the end message, the network address translation device to remove the network address translation mapping.

9. The network address translation traversal method of claim 8, further comprising:

the IMS creating a parameter mapping between a header record corresponding to the session description protocol and the port number of the second session description protocol parameter according to the comparison between the first session initiation protocol parameter and the second Internet protocol parameter; and the IMS instructing, according to the end message and the parameter mapping, the network address translation device to remove the network address translation mapping.

10. The network address translation traversal method of claim 7, further comprising:

the IMS instructing, according to the comparison between the first session initiation protocol parameter and the second Internet protocol parameter, the network address translation device to add a temporary session description protocol parameter in the network address translation mapping;

the peer terminal transmitting a message to the IMS after receiving the third invitation message, wherein the message comprises a session description protocol parameter corresponding to the peer terminal; and the IMS instructing, according to the message from the peer terminal, the network address translation device to replace the temporary session description protocol parameter with the session description protocol parameter corresponding to the peer terminal, wherein the temporary session description protocol parameter and the session description protocol parameter corresponding to the peer terminal each comprise an Internet protocol address and a port number.

11. The network address translation traversal method of claim 10, further comprising:

the user terminal equipment or the peer terminal transmitting an end message to the IMS; and the IMS instructing, according to the end message, the network address translation device to remove the network address translation mapping.

12. The network address translation traversal method of claim 11, further comprising:

the IMS creating a parameter mapping between a header record corresponding to the session description protocol and the port number of the second session description protocol parameter according to the comparison between the first session initiation protocol parameter and the second Internet protocol parameter; and the IMS instructing, according to the end message and the parameter mapping, the network address translation device to remove the network address translation mapping.

* * * * *